(12) United States Patent
Minamino et al.

(10) Patent No.: US 7,953,683 B2
(45) Date of Patent: *May 31, 2011

(54) LEARNING APPARATUS, LEARNING METHOD, AND PROGRAM FOR EFFICIENTLY LEARNING DYNAMICS

(75) Inventors: Katsuki Minamino, Tokyo (JP); Masato Ito, Tokyo (JP); Kenta Kawamoto, Tokyo (JP); Yukiko Yoshiike, Tokyo (JP); Hirotaka Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 528 days.

This patent is subject to a terminal disclaimer.

(21) Appl. No.: 11/732,773

(22) Filed: Apr. 4, 2007

(65) Prior Publication Data

US 2007/0239644 A1 Oct. 11, 2007

(30) Foreign Application Priority Data

Apr. 6, 2006 (JP) ................................. 2006-105546

(51) Int. Cl.
*G06F 15/18* (2006.01)
*G06N 3/08* (2006.01)
(52) U.S. Cl. ........................................ 706/25
(58) Field of Classification Search ............... 706/15, 706/16, 25
See application file for complete search history.

(56) References Cited

U.S. PATENT DOCUMENTS

| | | | | |
|---|---|---|---|---|
| 5,404,423 | A * | 4/1995 | Uchiyama et al. | 706/23 |
| 7,227,985 | B2 * | 6/2007 | Ikeda et al. | 382/159 |
| 7,296,005 | B2 * | 11/2007 | Minamino et al. | 706/15 |
| 7,464,061 | B2 * | 12/2008 | Grothmann et al. | 706/15 |
| 2003/0140019 | A1 * | 7/2003 | Gutta et al. | 706/15 |

FOREIGN PATENT DOCUMENTS

| | | |
|---|---|---|
| JP | 6-243273 | 9/1994 |
| JP | 11-126198 | 5/1999 |

OTHER PUBLICATIONS

Martinetz et al., ""Neural-Gas" NEtwork for Vector Quantization and its Application to Time-Series Prediction", IEEE Transactions on Neural Networks, vol. 4, No. 4, Jul. 1993, pp. 558-569.*
Jorg A. Walter and Klaus J. Schulten, "Implementation of Self-Organizing Neural Networks for Visuo-Motor Control of an Industrial Robot", IEEE Transactions on Neural Networks, vol. 4, No. 1, Jan. 1993, pp. 86-95.*
Syuji Kaneko, "Representing the bifurcation structure of BVP neuron model onto a self-organizing map by using modular network SOM (mnSOM)", Institute of Electronics, Information and Communication Engineers technical study reports vol. 104 No. 471, Japanese corporate judicial person Institute of Electronics, Information and Communication Engineers, Nov. 19, 2004, vol. 104.

* cited by examiner

*Primary Examiner* — Donald Sparks
*Assistant Examiner* — Vincent M Gonzales
(74) *Attorney, Agent, or Firm* — Frommer Lawrence & Haug LLP; William S. Frommer; Thomas F. Presson (57) ABSTRACT

A learning apparatus includes a storage unit configured to store a network formed by a plurality of nodes each holding dynamics; a learning unit configured to learn the dynamics of the network in a self-organizing manner on the basis of observed time-series data; a winner-node determiner configured to determine a winner node, the winner node being a node having dynamics that best match the time-series data; and a weight determiner configured to determine learning weights for the dynamics held by the individual nodes according to distances of the individual nodes from the winner node. The learning unit is configured to learn the dynamics of the network in a self-organizing manner by degrees corresponding to the learning weights.

7 Claims, 8 Drawing Sheets

LEARNING APPARATUS, LEARNING METHOD, AND PROGRAM FOR EFFICIENTLY LEARNING DYNAMICS

CROSS REFERENCES TO RELATED APPLICATIONS

The present invention contains subject matter related to Japanese Patent Application JP 2006-105546 filed in the Japanese Patent Office on Apr. 6, 2006, the entire contents of which are incorporated herein by reference.

BACKGROUND OF THE INVENTION

1. Field of the Invention

The present invention relates to learning apparatuses, learning methods, and programs. More specifically, the present invention relates to a learning apparatus, a learning method, and a program with which dynamics can be learned efficiently.

2. Description of the Related Art

It is known that actions (movements) of robots can be described as dynamical systems defined by time-evolution rules, and that dynamical systems of various actions can be implemented by specific attractor dynamics.

For example, walking movements of a bipedal robot, such as a humanoid robot, can be described as limit cycle dynamics, which are characterized in that the states of movement of a system converge to a specific periodic orbit from various initial states. This is described, for example, in G. Taga, 1998, "Self-organized control of bipedal locomotion by neural oscillators in unpredictable environment", Biological Cybernetics, 65, 147-159, and Gentaro Taga, "Nou to shintai no douteki dezain—Undou chikaku no hisenkei rikigakukei to hattatsu" (Dynamical design of the brain and the body—Nonlinear dynamical system and development of movement and perception), Kaneko Shobo. Furthermore, a reaching operation in which an arm robot extends its arms toward a certain object can be described as fixed-point dynamics, which are characterized in that various initial states converge to a specific fixed point. Furthermore, it is also said that any movement can be implemented by a combination of discrete movements that can be implemented by fixed-point dynamics and cyclic movements that can be implemented by limit cycle dynamics.

Issues that are to be addressed in order to control actions (movements) of a robot according to attractor dynamics include designing attractor dynamics in accordance with tasks, and generating appropriate motor outputs according to the attractor dynamics on the basis of information obtained from sensor inputs. For this purpose, outputs for actions of the robot should be generated in such a manner that the attractor dynamics continuously interact with the environment.

Methods for learning attractor dynamics instead of manually designing attractor dynamics have been proposed. One of the methods uses a recurrent neural network (hereinafter referred to as an RNN). The RNN includes context units that are connected to the network via a feedback loop. It is known that, theoretically, arbitrary dynamical systems can be approximated by holding internal states in the context units.

However, in a learning model composed of one tightly connected network module, when a large number of dynamics are learned for learning actions in a large scale, considerable interference occurs among dynamics that are to be stored, so that learning becomes difficult.

In view of this problem, several learning models employing modular architectures have been proposed. In a modular architecture, a plurality of network modules are combined to form a single learning model. In the modular architecture, in principle, by increasing the number of modules, it is readily possible to increase dynamics that can be stored. However, an issue arises as to selection of a module that is to be used for learning of a given learning sample.

Depending on the method of module selection, learning methods can be classified into supervised learning and unsupervised learning. In supervised learning, assignment of learning samples to modules is determined manually. On the other hand, in unsupervised learning, assignment of learning samples to modules is determined autonomously by the learning model. In order for a robot or a system to perform learning autonomously, unsupervised learning is to be employed for learning of modules.

As a method for learning of modules by unsupervised learning, a learning model called the mixture of RNN experts has been proposed. The mixture of RNN experts is described, for example, in Japanese Unexamined Patent Application Publication No. 11-126198. According to this learning model, outputs of a plurality of RNN modules are integrated by gate mechanisms to determine a final output, and learning of modules the individual RNNs proceeds by adjusting the gates according to maximum likelihood estimation so as to maximize the performance of the final output.

However, according to the method based on global optimization, learning becomes difficult when the number of modules becomes huge.

On the other hand, in methods such as self-organization map (hereinafter referred to as SOM) or neural gas used for learning categories of vector patterns, learning rules based on global optimization are not used, so that optimality is not ensured. However, it is known that these methods allow learning an appropriate category structure in a self-organizing manner by unsupervised learning. With these methods, learning is practically possible even when the number of modules is huge. The SOM is described, for example, in T. Kohonen, "Jiko soshikika mappu" (Self-organization map), Springer-Verlag Tokyo. The neural gas is described, for example, in T. M. Martinetz, S. G. Berkovich, K. J. Schulten, ""Neural-Gas" Network for Vector Quantization and its Application to Time-Series Prediction", IEEE Trans. Neural Networks, VOL. 4, NO. 4, pp. 558-569, 1993.

SUMMARY OF THE INVENTION

In Japanese Patent Application No. 2004-353832, the assignee of this application has proposed a model for learning time-series patterns instead of vector patterns.

However, a method for efficiently learning dynamics has not been proposed.

There exists a demand for efficiently learning dynamics.

According to an embodiment of the present invention, there is provided a learning apparatus including storage means for storing a network formed by a plurality of nodes each holding dynamics; learning means for learning the dynamics of the network in a self-organizing manner on the basis of observed time-series data; winner-node determining means for determining a winner node, the winner node being a node having dynamics that best match the time-series data; and weight determining means for determining learning weights for the dynamics held by the individual nodes according to distances of the individual nodes from the winner node. The learning means learns the dynamics of the network in a self-organizing manner by degrees corresponding to the learning weights.

The dynamics may be modeled by a dynamical-system approximation model having internal-state quantities.

The dynamics may be modeled by a recurrent neural network.

The learning means may learn the dynamics of the network by a gradient method based on repeated calculation in which the magnitude of a gradient or the number of iterations of the repeated calculation is determined in accordance with the learning weights.

According to another embodiment of the present invention, there is provided a learning method including the steps of determining a winner node among a plurality of nodes holding dynamics and forming a network, the winner node being a node having dynamics that best match observed time-series data; determining learning weights for the dynamics held by the individual nodes according to distances of the individual nodes from the winner node; and learning the dynamics of the network in a self-organizing manner on the basis of the time-series data by degrees corresponding to the learning weights.

According to another embodiment of the present invention, there is provided a computer program for causing a computer to execute processing including the steps of determining a winner node among a plurality of nodes holding dynamics and forming a network, the winner node being a node having dynamics that best match observed time-series data; determining learning weights for the dynamics held by the individual nodes according to distances of the individual nodes from the winner node; and learning the dynamics of the network in a self-organizing manner on the basis of the time-series data by degrees corresponding to the learning weights.

According to these embodiments of the present invention, a winner node is determined among a plurality of nodes holding dynamics and forming a network, the winner node being a node having dynamics that best match observed time-series data; learning weights for the dynamics held by the individual nodes are determined according to distances of the individual nodes from the winner node; and the dynamics of the network are learned in a self-organizing manner on the basis of the time-series data by degrees corresponding to the learning weights.

Accordingly, dynamics can be learned efficiently.

DESCRIPTION OF THE PREFERRED EMBODIMENTS

Before describing embodiments of the present invention, examples of corresponding relationship between the features of the present invention and the embodiments described in this specification or shown in the drawings will be described below. This description is intended to ensure that embodiments supporting the present invention are described in this specification or shown in the drawings. Thus, even if any embodiment described in this specification or shown in the drawings is not described as corresponding to certain features of the present invention, that does not necessarily mean that the embodiment does not correspond to those features. Conversely, even if any embodiment is described herein as corresponding to certain features, that does not necessarily mean that the embodiment does not correspond to other features.

A learning apparatus according to an embodiment of the present invention includes storage means (e.g., a network storage unit 1-5 shown in FIG. 1) for storing a network (e.g., a dynamics storage network) formed by a plurality of nodes each holding dynamics; learning means (e.g., a learning unit 1-4 shown in FIG. 1) for learning the dynamics of the network in a self-organizing manner on the basis of observed time-series data; winner-node determining means (e.g., a winner-node determiner 7-2 shown in FIG. 4) for determining a winner node, the winner node being a node having dynamics that best match the time-series data; and weight determining means (e.g., a learning-weight determiner 7-3 shown in FIG. 4) for determining learning weights for the dynamics held by the individual nodes according to distances of the individual nodes from the winner node. The learning means learns the dynamics of the network in a self-organizing manner by degrees corresponding to the learning weights (e.g., step S8 shown in FIG. 6).

Figure 6:
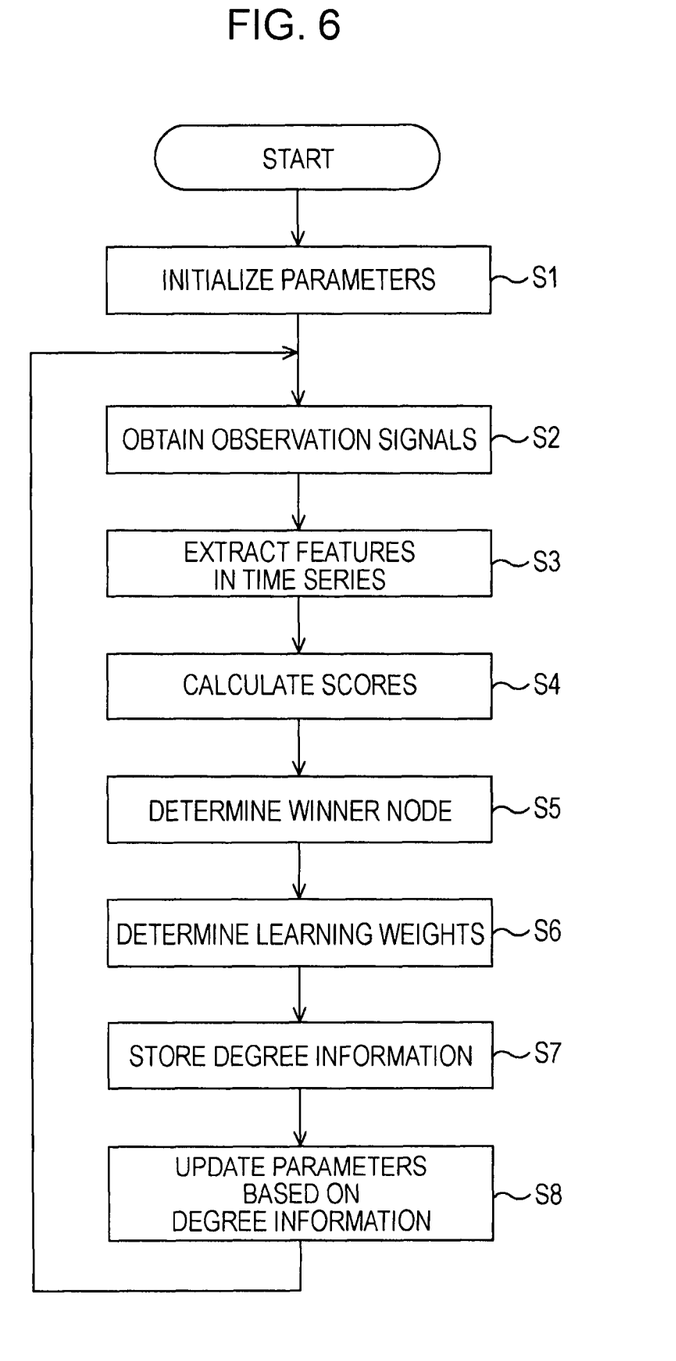
FIG. 6 is a flowchart of a learning process.

A learning method or a program according to an embodiment of the present invention includes the steps of determining a winner node among a plurality of nodes holding dynamics and forming a network (e.g., a dynamics storage network), the winner node being a node having dynamics that best match observed time-series data (e.g., step S5 shown in FIG. 6); determining learning weights for the dynamics held by the individual nodes according to distances of the individual nodes from the winner node (e.g., step S6 shown in FIG. 6); and learning the dynamics of the network in a self-organizing manner on the basis of the time-series data by degrees corresponding to the learning weights (e.g., step S8 shown in FIG. 6).

Now, specific embodiments of the present invention will be described in detail with reference to the drawings.

Figure 1:
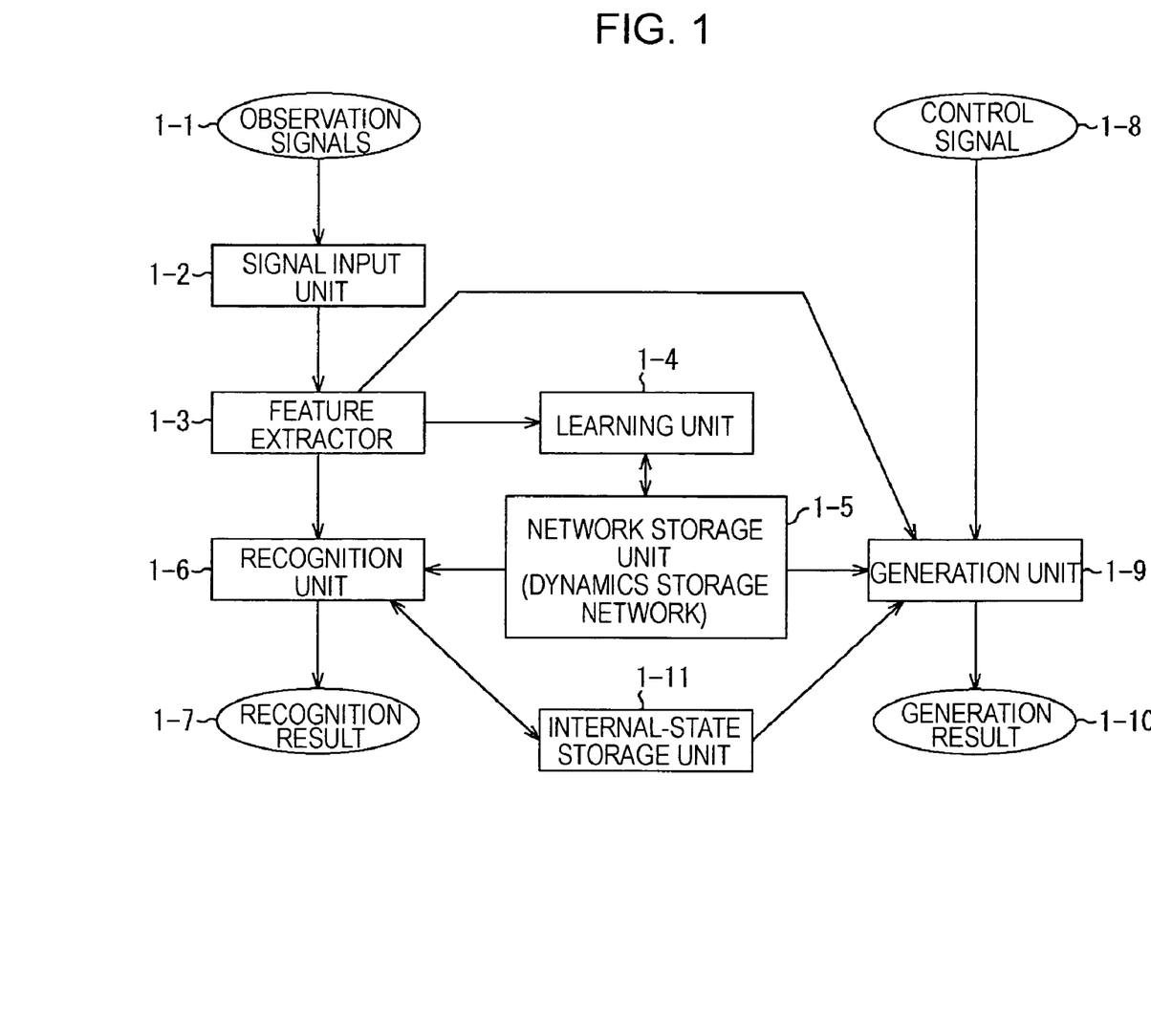
FIG. 1 is a block diagram showing an example configuration of a data processing apparatus according to an embodiment of the present invention.

FIG. 1 is a block diagram showing an example configuration of a data processing apparatus according to an embodiment of the present invention.

Referring to FIG. 1, the data processing apparatus includes a network storage unit 1-5 that stores a dynamics storage network including nodes each implemented by a dynamical-system approximation model having internal-state quantities, and a learning unit 1-4 that updates parameters of the dynamics storage network in a self-organizing manner.

Each node of the dynamics storage network holds dynamics representing dynamical characteristics of time-series data. The dynamics held by each node of the dynamics storage network, defined by the parameters updated by the learning unit 1-4, are used for recognition and generation of time-series data.

The data processing apparatus shown in FIG. 1 is used, for example, for recognition or generation of control signals for a robot or the like. Particularly, the data processing apparatus is used for learning, recognition, or generation of signals input to or output from sensors and motors in an autonomous system, an autonomous robot, or the like.

In the data processing apparatus shown in FIG. 1, signals input to the data processing apparatus and signals output from the data processing apparatus are both input to a signal input unit 1-2 as observation signals 1-1. The observation signals 1-1 include, for example, audio or image signals, signals representing luminance levels of light emitting diodes (LEDs), signals representing rotation angles or angular velocities of motors, and so forth.

The signal input unit 1-2 outputs electric signals corresponding to the input observation signals 1-1 to a feature extractor 1-3. More specifically, when the observation signals 1-1 are audio signals, the signal input unit 1-22 corresponds to, for example, a microphone. When the observation signals 1-1 are image signals, the signal input unit 1-2 corresponds to, for example, a camera. When the observation signals 1-1 are signals representing rotation angles or angular velocities of motors, the signal input unit 1-2 corresponds to, for example, devices for measuring rotation angles or angular velocities of the motors.

Hereinafter, signals output from the signal input unit 1-2, as well as signals input to the signal input unit 1-2, will be referred to as observation signals 1-1. The observation signals 1-1 may be either stationary signals or time-varying non-stationary signals.

Furthermore, in the following description, sensor/motor signals in a robot system will be mainly used as an example of the observation signals 1-1. The sensor/motor signals are vectors having components representing, for example, signals output from sensors or control signals input to motors in order to control the motors. Obviously, the observation signals 1-1 are not limited to sensor/motor signals.

Furthermore, the signal input unit 1-2 includes a segment detector or the like that outputs sensor/motor signals as divided into predetermined segments. The manner of segmentation is not particularly limited as long as sensor/motor signals are output as divided into appropriate lengths. Thus, sensor/motor signals divided into appropriate lengths in an optimal manner in accordance with input sensor/motor signals are output from the signal input unit 1-2 as the observation signals 1-1.

The feature extractor 1-3 extracts features in time series from the observation signals 1-1 output from the signal input unit 1-2. For example, the feature extractor 1-3 executes processing such as frequency analysis at regular time intervals on audio signals, which are a type of sensor signals, to thereby extract features, such as mel-cepstrum, in time series. The mel-cepstrum is a type of feature that is widely used in speech recognition or the like.

The feature extractor 1-3 supplies the time-series feature data (hereinafter simply referred to as time-series data) obtained by extracting features in time series from the observation signals 1-1 to the learning unit 1-4, a recognition unit 1-6, and a generation unit 1-9.

The learning unit 1-4 learns dynamics representing features of temporal change in the time-series data by a predetermined degree, using the time-series data supplied from the feature extractor 1-3. More specifically, the learning unit 1-4 updates the parameters of the dynamics storage network holding the dynamics by a predetermined degree.

As will be described later in detail, basically, when time-series data not having labels assigned thereto is successively given to the learning unit 1-4, the learning unit 1-4 executes unsupervised learning so that feature dynamics in the time-series data are obtained in a self-organizing manner. As a result, the dynamics storage network stored in the network storage unit 1-5 efficiently holds representative dynamics. The dynamics can be used at any time as needed by the recognition unit 1-6 or the generation unit 1-9.

The dynamics represent a time-varying dynamical system, and can be represented, for example, by a specific function. The dynamics storage network holds dynamics representing features of temporal change in the time-series data.

The recognition unit 1-6 determines dynamics most approximate to the time-series data supplied from the feature extractor 13, with reference to the dynamics that have been held in the dynamics storage network through learning that has been performed. Then, the recognition unit 1-6 outputs the result as a recognition result 1-7.

The generation unit 1-9 can generate time-series data as needed from the dynamics held in the dynamics storage network. The generation unit 1-9 executes a generation process to generate time-series data.

More specifically, the generation unit 1-9 obtains a control signal 1-8 specifying which dynamics are to be used to generate time-series data. The generation unit 1-9 generates time-series data from the specified dynamics on the basis of the control signal 1-8, the time-series data supplied from the feature extractor 1-3, and the dynamics storage network. Then, the generation unit 19 outputs the time-series data as a generation result 1-10.

An internal-state storage unit 1-11 holds internal-state quantities of each node of the dynamics storage network. For example, the internal-state quantities stored in the internal-state storage unit 1-11 are updated by the recognition unit 1-6 and used by the generation unit 1-9.

Figure 2:
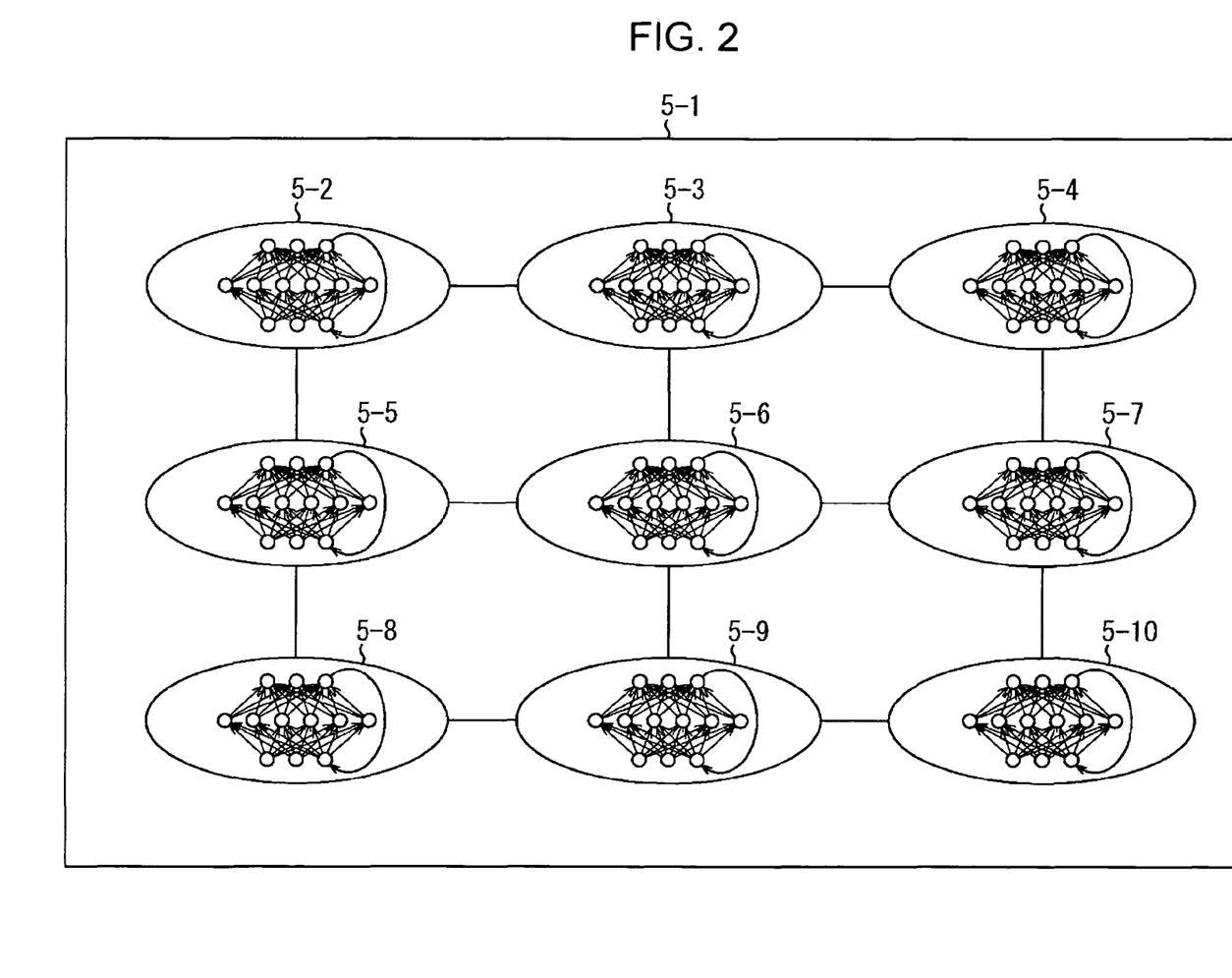
FIG. 2 is a diagram showing an example of a dynamics storage network.

FIG. 2 shows an example of the dynamics storage network 5-1 stored in the network storage unit 1-5 shown in FIG. 1.

FIG. 2 shows a dynamics storage network 5-1 in which all the nodes 5-2 to 5-10 are arranged two-dimensionally with links provided between vertically and horizontally adjacent nodes.

Hereinafter, the nodes 5-2 to 5-10 will be collectively referred to as nodes 5 unless distinction should be made among the individual nodes 5-2 to 5-10.

The links are used to define the spatial arrangement of the nodes 5. That is, the dynamics storage network 5-1 shown in FIG. 2 is an example of a dynamics storage network having a two-dimensional arrangement of nodes. As shown in FIG. 2, the spatial distances among the nodes 5 are determined according to the spatial arrangement of the nodes 5 as defined by the links.

For example, in the example shown in FIG. 2, regarding a subject node 5, a node that is directly connected to the subject node 5, i.e., a node adjacent to the subject node 5, has a smallest distance to the subject node, and the distance to the subject node increases for nodes 5 that can be reached by following further links in order from the adjacent node.

The spatial arrangement of the nodes 5 may be defined differently from the example shown in FIG. 2 depending on the configuration of links, and the spatial arrangement can be defined arbitrarily by using links.

Figure 3:
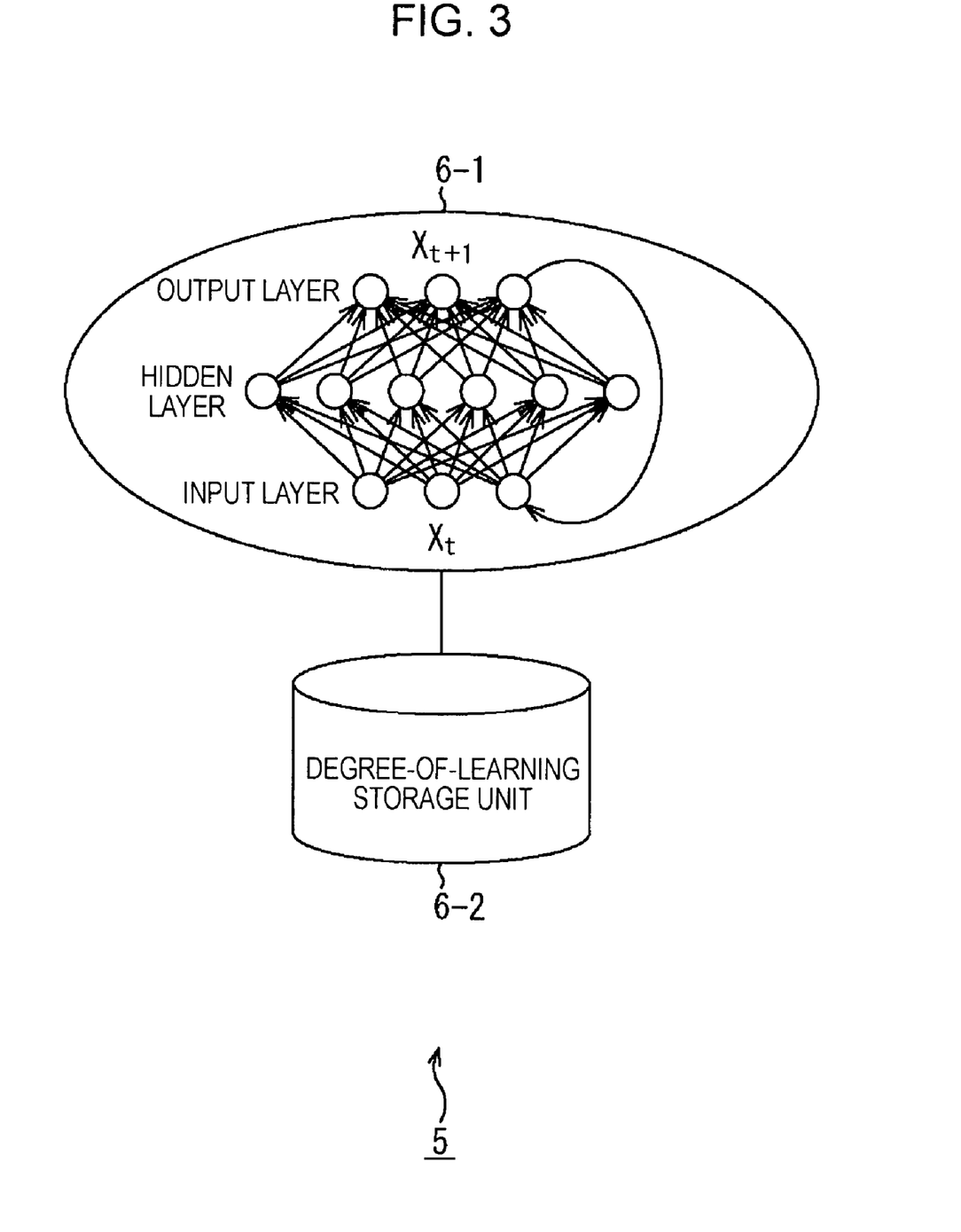
FIG. 3 is a diagram showing an example of a node.

FIG. 3 is a diagram showing details of the node 5.

The node 5 includes a dynamical-system approximation model 6-1 having internal-state quantities, and a degree-of-learning storage unit 6-2 that stores information representing a degree of learning of parameters of the dynamical-system approximation model 6-1 (hereinafter referred to as degree information). As the dynamical-system approximation model 6-1, for example, an RNN can be used. In this case, as the internal-state quantities, context is fed back from the output layer to the input layer of the RNN. The degree-of-learning storage unit 6-2 is a part of the storage area of the network storage unit 1-5 (FIG. 1).

In FIG. 3, as the dynamical-system approximation model 6-1, an RNN in which a feedback loop from an output layer to an input layer is provided in a three-layer neural network (NN) is used. Using the RNN, learning is performed to learn to predict and output a state vector $X_{T+1}$ at time T+1 on the basis of input of a state vector $X_T$ at time T in time-series data. That is, time-evolution rules of time-series data can be learned through prediction learning.

As a method of estimating parameters in a dynamical-system approximation model having internal-state quantities, such as an RNN, usually, back-propagation through time (BPTT) is used. BPTT is a learning method based on the steepest-descent method. The BPTT is described, for example, in D. E. Rumelhart, G. E. Hinton & R. E. Williams, 1986, "Learning internal representations by error propagation", in D. E. Rumelhart & J. McClelland, "Parallel distributed processing", pp. 318-364, Cambridge, Mass.: MIT Press, and R. J. Williams and D. Zipser, "A learning algorithm for continually running fully recurrent neural networks", Neural Computation, 1: 270-280, 1989.

The dynamical-system approximation model 6-1 learns dynamics representing a time-series pattern of learning data, i.e., time-series data supplied from the learning unit 1-4, by a degree represented by the degree information stored in the degree-of-learning storage unit 6-2.

The learning performed by the learning unit 1-4 is online learning. That is, each time observation signals 1-1 are input, the learning unit 1-4 updates parameters of the dynamical-system approximation model 6-1 little by little using the observation signals 1-1 as learning data.

The degree-of-learning storage unit 6-2 stores degree information supplied from the learning unit 1-4. Thus, the degree of effect of learning data on the parameters of the dynamical-system approximation model 6-1 is adjusted.

As described above, the learning unit 1-4 learns a time-series pattern of learning data while adjusting the degree of learning according to the degree information stored in the degree-of-learning storage unit 6-2.

Next, updating of parameters by the learning unit 1-4 will be described.

First, the back propagation method, on which the back propagation through time (BPTT) method for estimating parameters is based, will be described briefly.

It is assumed herein that sigmoid functions f(x) are used for units other than units in the input layer of the dynamical-system approximation model 6-1.

Now, let data Y input to units be denoted as $y_0, y_1, \ldots, y_{n-1}$, and expected data R expected as outputs from units be denoted as $r_0, r_1, \ldots, r_{m-1}$. n denotes the number of units in the input layer, and m denotes the number of units in the output layer.

First, output data $o_j$ of a unit j from the input layer toward the output layer is calculated according to equation (1) below:

$$o_j = f\left(\sum_{i=1}^{n-1} w_{ij} o_i\right) \quad (1)$$

In equation (1), $o_i$ denotes output data of a unit i. $w_{ij}$ denotes a weight assigned to a connection from the unit i to the unit j, which is a parameter of the dynamical-system approximation model 6-1.

Then, on the basis of the output data $o_j$ calculated according to equation (1), the parameters $w_{ij}$ are updated from the output layer toward the input layer according to equation (2) below:

$$w_{ij}(n+1) = w_{ij}(n) + \eta \delta_j o_i \quad (2)$$

In equation (2), $w_{ij}(n)$ denotes a parameter $w_{ij}$ that is updated on an n-th occasion, and $\eta$ denotes a gain parameter for adjusting the amount of change of the parameter $w_{ij}$. $\delta_j$ denotes an error parameter of the unit j. When the unit j is a unit in the output layer, the error parameter $\delta_j$ is calculated on the basis of the expected data $r_k$ (k is a value among k=0, 1, ..., m−1) and the output data $o_j$. When the unit j is a unit in the hidden layer, the error parameter $\delta_j$ is calculated by propagating errors in the output layer, which is an upper layer of the hidden layer.

The parameters $w_{ij}$ are repeatedly updated according to equation (2) until the outputs $o_j$ become sufficiently approximate to the expected data $r_k$.

The back propagation method is described, for example, in R Beale and T. Jackson, "Nyuural konpyuutingu nyuumon" (Introduction to neural computing), Kaibundo.

The back propagation method described above is a learning method based on the steepest descent method. In the back propagation method, learning is performed by a gradient method based on repeated calculation. The BPTT method is an extension of the back propagation method to recurrent neural networks.

The BPTT method is similar to the back propagation method in that it is a learning method based on the steepest descent method, and in that parameters are repeatedly updated until outputs from units become sufficiently approximate to expected outputs, i.e., learning is performed by a gradient method based on repeated calculation.

Furthermore, in the BPTT method, similarly to the back propagation method, a gain parameter $\eta$ for adjusting the amount of change of parameters is used in an equation for updating parameters. The gain parameter $\eta$ serves to adjust the step size of change in the gradient method, i.e., the value of the gradient in the gradient method.

In the back propagation method and the BPTT method, generally, convergence to a globally optimal solution as a result of learning is not ensured. Thus, there exists a risk of convergence to a locally optimal solution as a result of learning.

In order to avoid this problem, for example, in a method that has been proposed, the gain parameter $\eta$ is initially chosen to be a large value and is gradually decreased. That is, as well as serving to adjust the amount of change of parameters, the gain parameter $\eta$ serves to achieve stable convergence to a globally optimal solution in learning based on the steepest descent method. With the former role of the gain parameter $\eta$, it is possible to adjust the degree of effect of learning data.

Furthermore, considering the number of iterations N in the repeated calculation, the degree of effect of learning data increases as the number of iterations N increases, while the degree of effect of learning data decreases as the number of iterations N decreases. Thus, it is possible to adjust the degree of effect of learning data using the number of iterations N.

As described above, it is possible to adjust the degree of effect of learning data, i.e., the degree of learning, using the gain parameter $\eta$ or the number of iterations N. Thus, the gain parameter $\eta$ or the number of iterations N is used as the degree information stored in the degree-of-learning storage unit 6-2.

Figure 4:
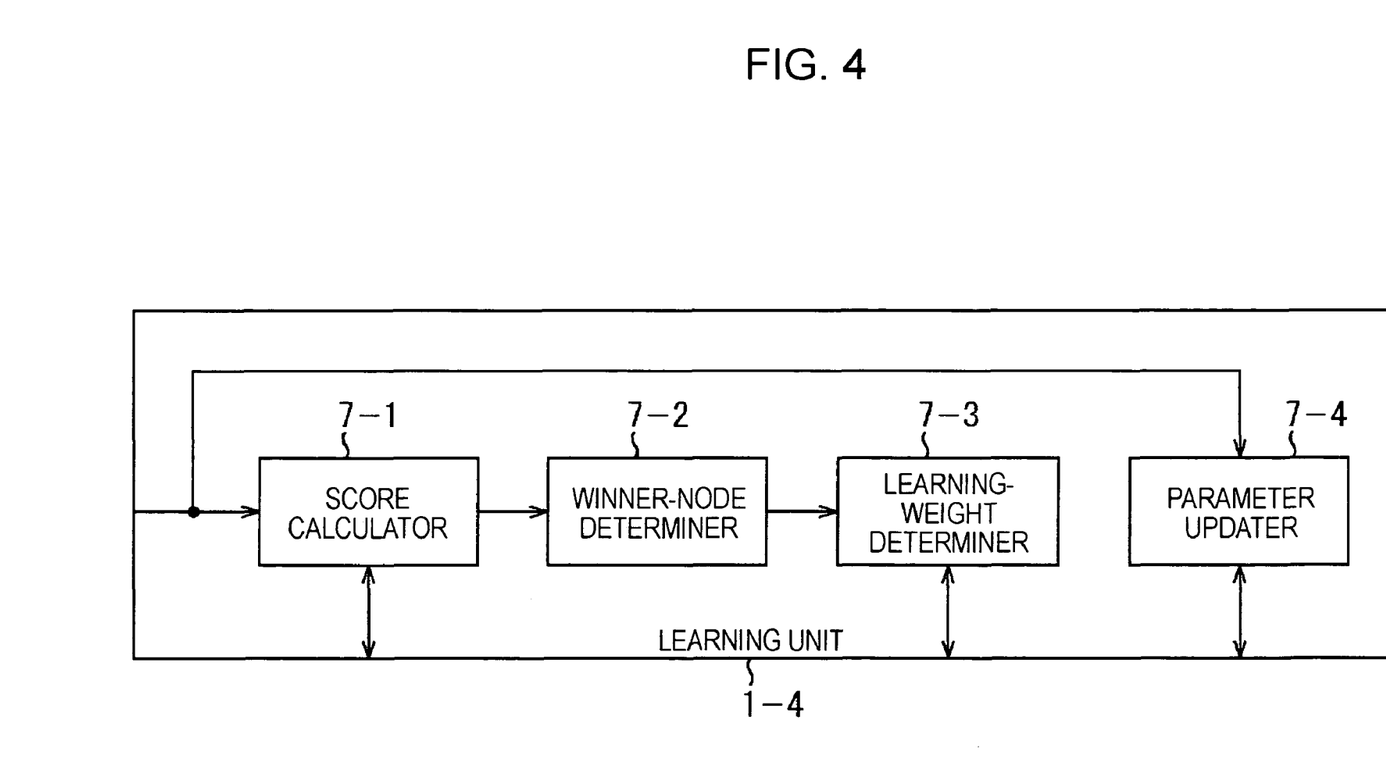
FIG. 4 is a block diagram showing an example of detailed configuration of a learning unit.

FIG. 4 is a block diagram showing an example of detailed configuration of the learning unit 1-4 shown in FIG. 1.

The learning unit 1-4 includes a score calculator 7-1, a winner-node determiner 7-2, a learning-weight determiner 7-3, and a parameter updater 7-4. The learning unit 1-4 receives input of time-series data from the feature extractor 1-3 shown in FIG. 1, and the time-series data is supplied to the score calculator 7-1 and the parameter updater 7-4 as learning data.

The score calculator 7-1 calculates a score, regarding the learning data supplied from the feature extractor 1-3, for the dynamical-system approximation model 6-1 of each node 5 included in the dynamics storage network 5-1 stored in the network storage unit 1-5 while updating the internal-state quantities.

More specifically, the score calculator 7-1 calculates a prediction error for each node 5, the prediction error corresponding to an average square error between true values of output associated with the learning data and values output from the dynamical-system approximation model 6-1 and associated with the learning data. The score calculator 7-1 assigns the prediction error to the node 5 as a score.

The score calculator 7-1 determines an initial value of context representing internal-state quantities of the dynamical-system approximation model 6-1, and calculates a score while updating the context from the initial value. As the initial value, the score calculator 84 selects a value that minimizes the score among values obtained by successively updating a predetermined reference value.

As the predetermined value used to determine initial values of context, for example, a random value, or the last updated value of context obtained in the previous iteration of learning of the dynamical-system approximation model 6-1 can be used.

When it is known that learning data used for the current iteration of learning has no relationship with learning data used in the previous iteration of learning, for example, a random value can be used as the predetermined value used to determine initial values of context.

On the other hand, when it is known that learning data used for the current iteration of learning has a certain relationship with learning data used in the previous iteration of learning, as in the case of continuous time-series data, for example, the last updated value can be used as the predetermined value used to determine initial values of context. When the last updated value is used as the predetermined value used to determine initial values of context, it is possible to use the last updated value as an initial value of context without updating.

The score calculator 7-1 supplies the scores assigned to the individual nodes 5 as results of score calculation to the winner-node determiner 7-2. The winner-node determiner 7-2 compares the scores of the individual nodes 5, supplied from the score calculator 7-1, and determines a node 5 with a smallest score as a winner node that best matches the learning data. Then, the winner-node determiner 7-2 supplies information identifying the winner node to the learning-weight determiner 7-3.

The learning-weight determiner 7-3 refers to the dynamics storage network 5-1 stored in the network storage unit 1-5 and calculates a distance d of each node 5 from the winner node identified by the information supplied from the winner-node determiner 7-2. Then, the learning-weight determiner 7-3 determines a learning weight $\alpha$ ($0<\alpha\leq 1$) for each node 5 on the basis of the distance d.

Furthermore, on the basis of the learning weight $\alpha$, the learning-weight determiner 7-3 generates degree information for each node 5. For example, the learning-weight determiner 7-3 generates degree information representing the gain parameter $\eta$ or the number of iterations N on the basis of the learning weight $\alpha$ according to equations (3) below:

$$\eta = \eta_0 \times \alpha$$

$$N = N_0 \times \alpha \quad (3)$$

In equations (3), $\eta_0$ is the gain parameter $\eta$ for the learning weight $\alpha$ of 1, and $N_0$ is the number of iterations N for the learning weight $\alpha$ of 1. According to equations (3), for example, when the number of iterations $N_0$ is 100, the number of iterations N is 100 with the learning weight $\alpha$ of 1, and the number of iterations N is 10 with the learning weight $\alpha$ of 0.1.

The learning-weight determiner 7-3 supplies the degree information that has been generated to the degree-of-learning storage unit 6-2 of each node 5 so that the degree information is stored therein. Thus, the degree of learning is adjusted.

For each node 5, the parameter updater 7-4 reads the degree information stored in the degree-of-learning storage unit 6-2, and learns dynamics representing a time-series pattern of the learning data supplied from the feature extractor 1-3, by a degree represented by the degree information. More specifically, for each node 5, the parameter updater 7-4 updates parameters of the dynamical-system approximation model 6-1 by performing repeated calculation of the BPTT method on the basis of the learning data and the degree information.

Next, the learning weight a will be described with reference to FIGS. 5A and 5B.

Figure 5A:
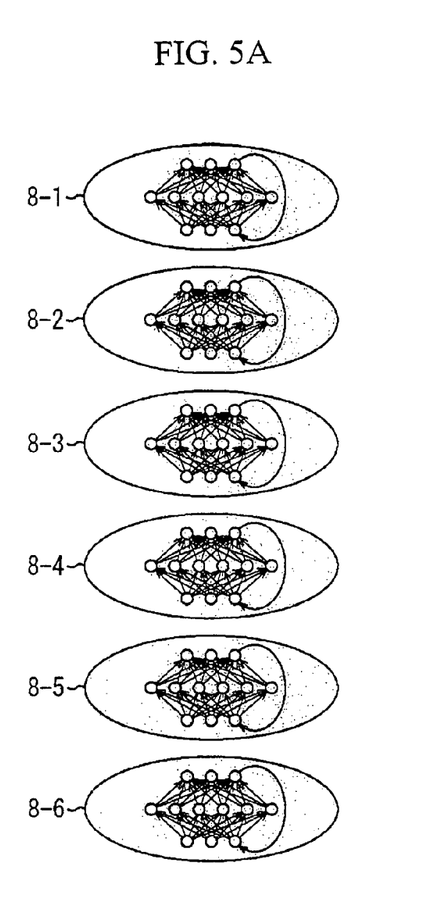
FIGS. 5A and 5B are diagrams showing relationship between distances from a winner node and learning weights.

Referring to FIG. 5A, nodes 8-1 to 8-6 are nodes constituting the dynamics storage network. Of the nodes 8-1 to 8-6, the node 8-1 is a winner node, and the nodes 8-2 to 8-6 are arranged in increasing order of distance from the winner node 8-1.

Figure 5B:
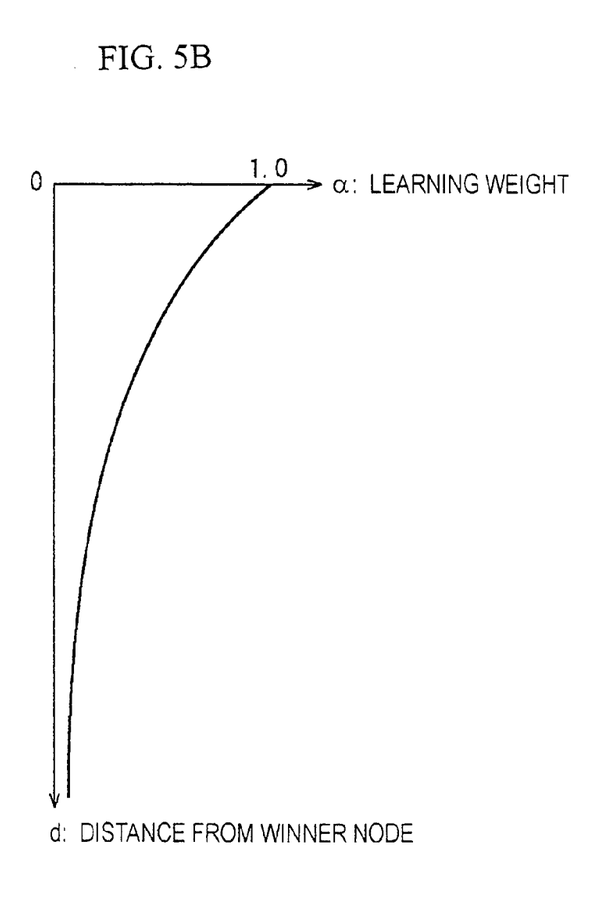

The graph shown in FIG. 5B shows relationship between the learning weight $\alpha$ and the distance d from the winner node 8-1. The horizontal axis represents the learning weight $\alpha$, and the vertical axis represents the distance d from the winner node 8-1.

According to the graph shown in FIG. 5B, the learning weights $\alpha$ are determined so that the learning weight a for the winner node 8-1 has a largest value of 1 and the learning weights a for the other nodes 8-2 to 8-6 decrease as the distance d from the winner node 8-1 increases.

The distance d from the winner node is determined on the basis of the spatial arrangement of the nodes as defined by the links of the dynamics storage network. For example, in the dynamics storage network 5-1 in which the nodes 5-2 to 5-10 are arranged two-dimensionally as shown in FIG. 2, when the winner node is the node 5-7, the nodes 5-4, 5-6, and 5-10 adjacent to the winner node 5-7 are closest, the nodes 5-3, 5-5, and 5-9 are next closest, and the nodes 5-2 and 5-8 are remotest. In this case, using the minimum number of links connecting the nodes 5 as the distance, the distance d is 1, 2, and 3 in increasing order of distance.

The relationship between the distance d from the winner node 8-1 and the learning weight $\alpha$, indicated in the graph shown in FIG. 5B, can be expressed by equation (4) below:

$$\alpha = \gamma^{(d/\Delta)} \quad (4)$$

In equation (4), $\gamma$ ($0<\gamma<1$) denotes an attenuation coefficient, and $\Delta$ denotes a variable for adjusting the learning weight a for neighborhood.

According to equation (4), the learning weight a can be calculated by raising the attenuation coefficient $\gamma$ to the power of $d/\Delta$. Furthermore, according to equation (4), since the attenuation coefficient $\gamma$ is a positive value less than 1, the learning weight a decreases as the distance d increases.

Now, let it be supposed that the distance d is 1, 2, 3, . . . in increasing order of distance from the winner node 8-1 and that the distance d of the winner node 8-1 is 0. For example, when the attenuation coefficient $\gamma$ is 0.5 and the variable $\Delta$ is 1, the learning weight a changes to be 1, 0.5, 0.25, 0.125, . . . as the distance d from the winner node 8-1 increases.

When the variable $\Delta$ is gradually decreased toward 0, the learning weight a decreases even further as the distance d from the winner node 8-1 increases. When the variable $\Delta$ becomes close to 0, the learning weight a for the nodes 5 other than the winner node 8-1 become substantially 0. As described above, it is possible to adjust the learning weights a for neighborhood of the winner node. Basically, the variable Δ is chosen to be a large value at the start of learning and is adjusted to decrease as time elapses.

The learning-weight determiner 7-3 determines a learning weight a for each node 5 according to equation (4). Then, on the basis of the learning weight α for each node 5, the learning-weight determiner 7-3 generates degree information for the node 5 according to equation (3). Then, the parameter updater 7-4 performs learning for each node 5 by a degree represented by the degree information.

Thus, according to the learning weight α, the learning unit 1-4 can learn dynamics using the winner node 8-1 at a highest degree while decreasing the degree as the distance from the winner node 8-1 increases. Accordingly, the parameters of the winner node 8-1 are updated so as to be affected most intensely by the learning data, and the parameters of the nodes 8-2 to 8-6 other than the winner node 8-1 are updated so that the effect decreases as the distance from the winner node 8-1 increases.

As described above, the learning unit 1-4 can perform learning efficiently according to the learning weights α.

In a possible method of reflecting the learning weights α in learning, the mixing ratio of learning data used for previous learning and observed time-series data is adjusted, thereby reflecting the learning weights α in learning indirectly. In this case, however, a huge amount of repeated calculation is carried out using adjusted learning data each time the mixing ratio is adjusted, so that the efficiency of calculation is low.

In contrast, the learning unit 1-4 reflects the learning weights a directly in learning by adjusting the degree of learning according to the learning weights α, so that learning can be performed efficiently according to the learning weights α. This serves to reduce the number of iterations and to thereby improve the efficiency of calculation. That is, in the learning performed by the learning unit 1-4, learning in a self-organizing manner and learning by a gradient method based on repeated calculation are combined appropriately.

Next, a learning process in which the data processing apparatus shown in FIG. 1 learns the dynamics storage network 5-1 will be described with reference to FIG. 6. The learning process is started, for example, when the data processing apparatus shown in FIG. 1 is powered on.

First, in step S1, the parameter updater 7-4 (FIG. 4) of the learning unit 1-4 initializes the parameters of the dynamics storage network 5-1 stored in the network storage unit 1-5. More specifically, appropriate values are assigned as initial values to the parameters of the dynamical-system approximation model 6-1 of each node 5 of the dynamics storage network 5-1.

After step S1, the process proceeds to step S2. In step S2, the signal input unit 1-2 shown in FIG. 1 obtains observation signals 1-1 and supplies the observation signals 1-1 to the feature extractor 1-3. The process then proceeds to step S3. In step S3, the feature extractor 1-3 extracts features of the observation signals 1-1 in time series, and supplies the resulting time-series data as learning data to the score calculator 7-1 and the parameter updater 7-4 of the learning unit 1-4.

After step S3, the process proceeds to step S4. In step S4, the score calculator 7-1 calculates a score, regarding the learning data supplied from the feature extractor 1-3, for the dynamical-system approximation model 6-1 of each node 5 included in the dynamics storage network 5-1 stored in the network storage unit 1-5 while updating the internal-state quantities. Then, the score calculator 7-1 supplies the scores assigned to the individual nodes 5 as results of score calculation to the winner-node determiner 7-2.

After step S4, the process proceeds to step S5. In step S5, the winner-node determiner 7-2 compares the scores for the individual nodes 5, supplied from the score calculator 7-1, and determines a node with a smallest score as the winner node 8-1. Then, the winner-node determiner 7-2 supplies information identifying the winner node 8-1 to the learning-weight determiner 7-3.

After step S5, the process proceeds to step S6. In step S6, the learning-weight determiner 7-3 refers to the dynamics storage network 5-1 stored in the network storage unit 1-5, and determines a learning weight α for each node 5 according to equation (4) given earlier.

After step S6, the process proceeds to step S7. In step S7, on the basis of the learning weight α for each node 5, the learning-weight determiner 7-3 generate degree information for the node 5 according to equations (3) given earlier, and supplies the degree information to the degree-of-learning storage unit 6-2 of the node 5 so that the degree information is stored therein.

After step S7, the process proceeds to step S8. In step S8, for each node 5, the parameter updater 7-4 performs repeated calculation of the BPTT method on the basis of the learning data supplied from the feature extractor 1-3 and the degree information, thereby updating the parameters of the dynamical-system approximation model 6-1. The process then returns to step S2, and the subsequent steps are repeated. In this manner, dynamics are learned by degrees represented by the degree information.

Next, a process of recognition and generation of time-series data by the data processing apparatus shown in FIG. 1 will be described with reference to FIG. 7.

Figure 7:
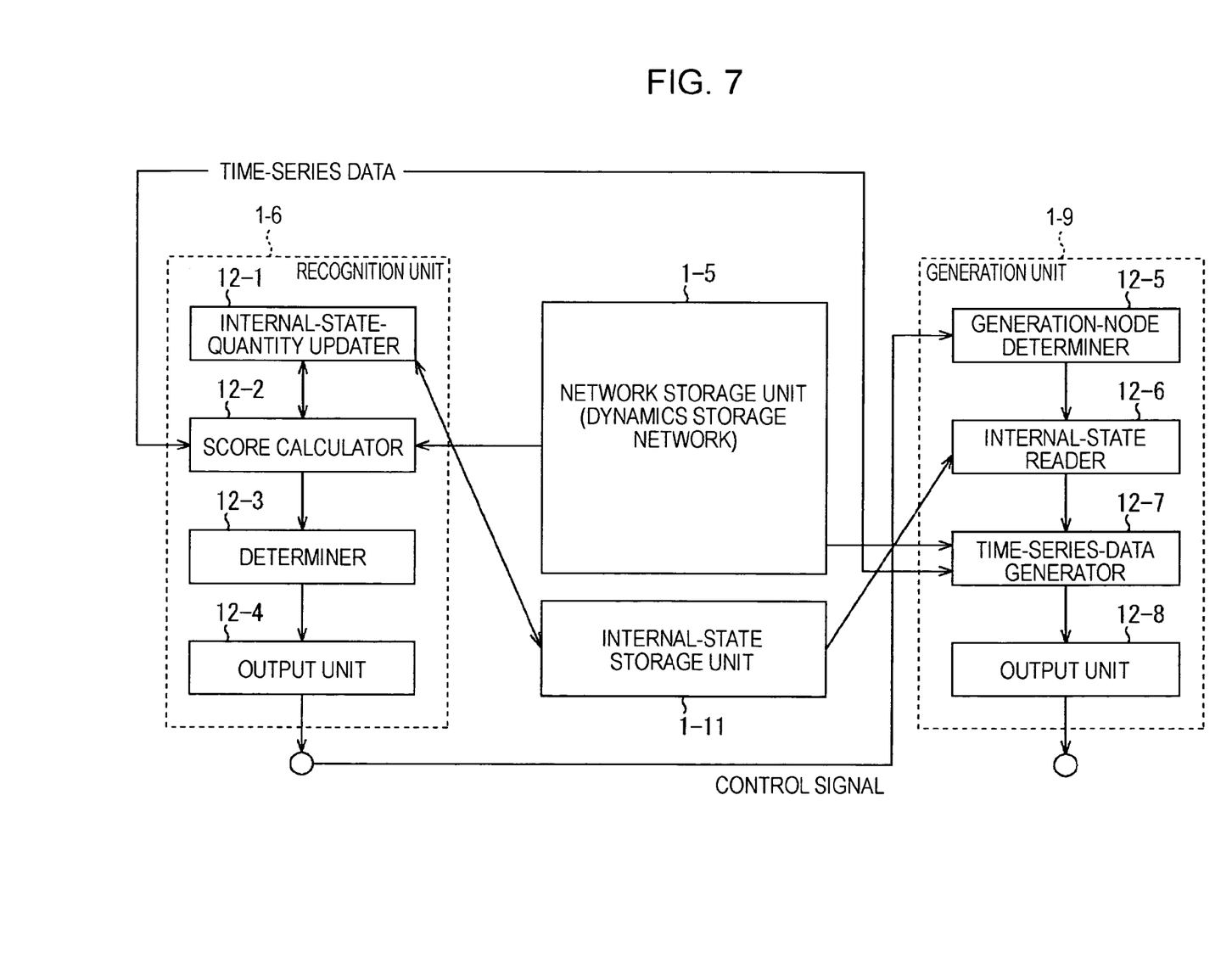
FIG. 7 is a block diagram showing an example of detailed configurations of a recognition unit and a generation unit.

FIG. 7 shows an example of detailed configurations of the recognition unit 1-6 and the generation unit 1-9 of the data processing apparatus shown in FIG. 1.

The recognition and generation of time-series data refers to recognizing input time-series data and generating new time-series data on the basis of results of the recognition.

In the recognition and generation, for example, when a person issues a speech to a robot, motor signals for taking actions in response to the speech, parameter signals for generating synthetic speech in response to the speech, or the like are generated in the robot.

As shown in FIG. 7, the recognition unit 1-6 includes an internal-state-quantity updater 12-1, a score calculator 12-2, a determiner 12-3, and an output unit 12-4.

The internal-state-quantity updater 12-1 reads the internal-state quantities that have been last updated and stored from the internal-state storage unit 1-11 into the dynamical-system approximation model 6-1 of each node 5. More specifically, the internal-state-quantity updater 12-1 reads the internal-state quantities from the internal-state storage unit 1-11, and supplies the internal-state quantities to the score calculator 12-2 as internal-state quantities of the dynamical-system approximation model 6-1 of each node 5.

Thus, in the dynamical-system approximation model 6-1, the internal-state quantities can be updated on the basis of the input time-series data using the values read by the internal-state-quantity updater 12-1 as initial values.

Furthermore, the internal-state-quantity updater 121 stores in the internal-state storage unit 1-11 the updated values of internal-state quantities of each node 5 at the time of determination of the winner node by the determiner 12-3 and the initial values of internal-state quantities of the node 5 at the time of determination of the winner node, supplied from the score calculator 12-2.

The updated values of the internal-state quantities stored in the internal-state storage unit 1-11 are read into the dynamical-system approximation model 6-1, and are used for a next iteration of score calculation. Furthermore, the initial values of internal-state quantities stored in the internal-state storage unit 1-11 are used for generation of time-series data by the generation unit 1-9.

Similarly to the score calculator 7-1, the score calculator 12-2 calculates a score, regarding the time-series data supplied from the feature extractor 1-3, for the dynamical-system approximation model 5-1 of each node 5 included in the dynamics storage network 5-1 stored in the network storage unit 1-5 while updating the internal-state quantities.

The score calculator 12-2 supplies the score assigned to each node 5 as a result of score calculation to the determiner 12-3. Furthermore, the score calculator 12-2 supplies the updated values and initial values of internal-state quantities of the node 5 at the time of assignment of the score to the internal-state-quantity updater 12-1 as the updated values and initial values of internal-state quantities of the node 5 at the time of determination of the winner node.

On the basis of the scores supplied from the score calculator 12-2, the determiner 12-3 determines a node with a smallest score as a winner node. That is, the determiner 12-3 selects dynamics associated with the winner node as dynamics that best match the time-series data input from the feature extractor 1-3. The determiner 12-3 supplies a signal identifying the winner node best matching the input time-series data to the output unit 12-4.

The output unit 12-4 outputs the signal identifying the winner node, supplied from the determiner 12-3, as a recognition result 1-7. In this manner, the recognition unit 1-6 recognizes the input time-series data. The recognition result 1-7 is used as a control signal 1-8 specifying a node 5 having dynamics that are to be used to generate time-series data.

The generation unit 1-9 shown in FIG. 7 includes a generation-node determiner 12-5, an internal-state reader 12-6, a time-series-data generator 12-7, and an output unit 12-8.

The generation-node determiner 12-5 receives a recognition result 1-7 output from the output unit 12-4 as a control signal 1-8. On the basis of the control signal 1-8, the generation-node determiner 12-5 determines a generation node, i.e., a node 5 with which time-series data is to be generated. That is, the winner node determined by the determiner 12-3 is determined as a generation node. Then, the generation-node determiner 12-5 supplies information identifying the generation node to the internal-state reader 12-6.

On the basis of the information supplied from the generation-node determiner 12-5, as initial values of internal-state quantities, the internal-state reader 12-6 reads values stored in the internal-state storage unit 1-11 into the dynamical-system approximation model 6-1 of the generation node among the nodes 5 included in the dynamics storage network 5-1 stored in the network storage unit 1-5.

That is, the internal-state reader 12-6 reads the initial values of internal-state quantities at the time of determination of the winner node by the recognition unit 1-6 among the values stored in the internal-state storage unit 1-11, and supplies the initial values of internal-state quantities to the time-series-data generator 12-7 as the initial values of internal-state quantities of the dynamical-system approximation model 6-1 of the generation node.

The time-series-data generator 12-7 receives time-series data supplied from the feature extractor 1-3. On the basis of the time-series data, the initial values of internal-state quantities supplied from the internal-state reader 12-6, and the dynamical-system approximation model 6-1 of the generation node, the time-series-data generator 12-7 generates time-series data while updating the internal-state quantities. Then, the time-series-data generator 12-7 supplies the time-series data to the output unit 12-8.

The output unit 12-8 outputs the time-series data supplied from the time-series-data generator 12-7 as a generation result 1-10. In this manner, as the generation result 1-10, the generation unit 1-9 generates and outputs time-series data from the winner node determined through recognition by the recognition unit 1-6.

As described above, in the data processing apparatus shown in FIG. 1, the winner-node determiner 7-2 determines a winner node, i.e., a node 5 having dynamics that best match observed time-series data among the nodes 5 holding dynamics and constituting the dynamics storage network 5-1, the learning-weight determiner determines a learning weight a for dynamics held by each node 5, and the parameter updater 7-4 learns the dynamics of the dynamics storage network 5-1 in a self-organizing manner on the basis of the time-series data by degrees represented by degree information corresponding to the learning weights $\alpha$. Accordingly, dynamics can be learned efficiently.

In the above description, a score corresponds to an average square error between true values of output associated with time-series data and values output from the dynamical-system approximation model 6-1 and associated with the time-series data. However, without limitation, for example, the score may correspond to a distance or a probability. When the score corresponds to a distance, similarly to the case where the score corresponds to an average square error, a node having a small score is determined as a winner node. On the other hand, when the score corresponds to a probability, a node having a large score is determined as a winner node.

The series of processes described above may be executed by hardware or by software. When the series of processes are executed by software, programs constituting the software are installed on a general-purpose computer or the like.

Figure 8:
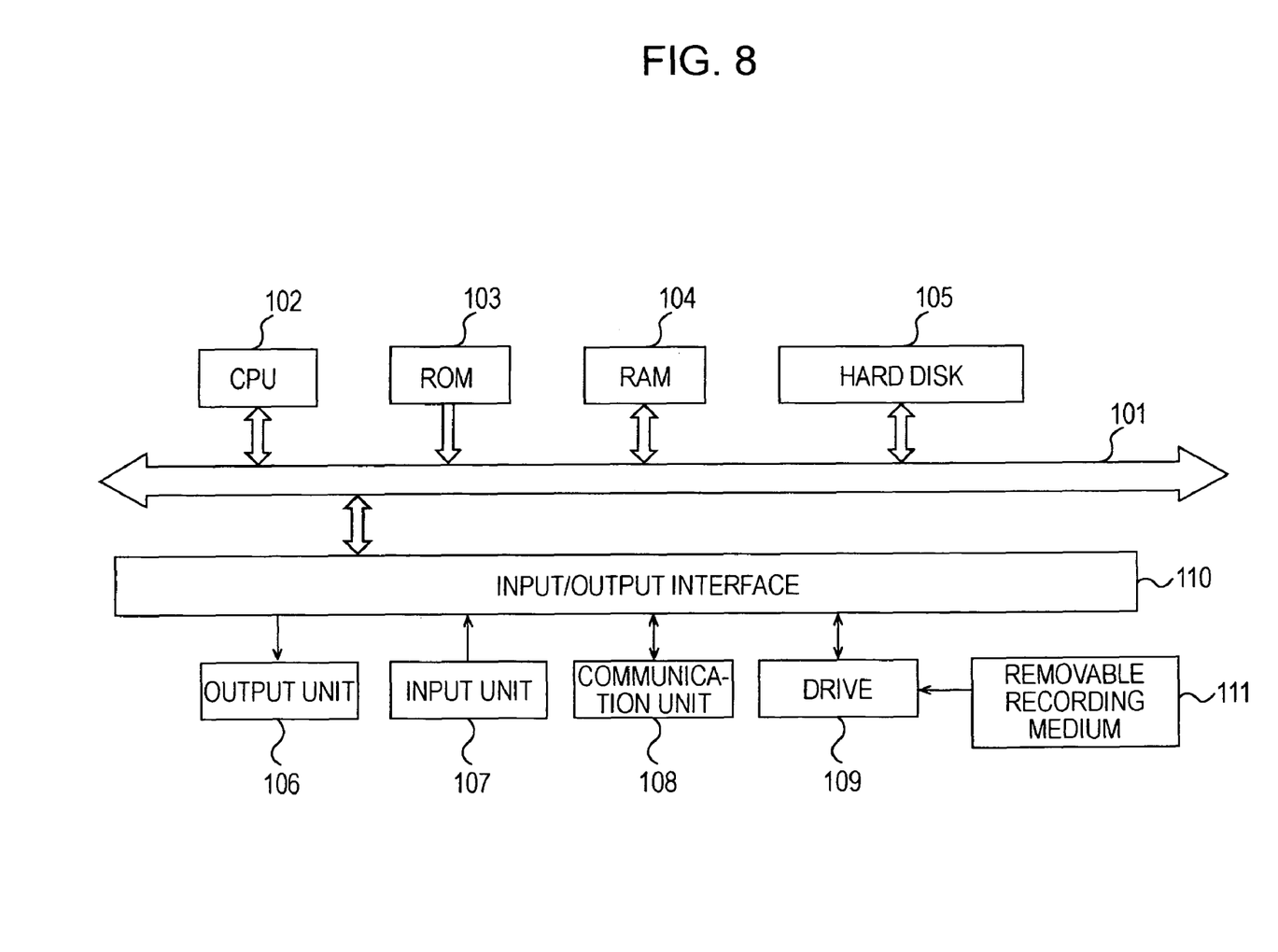
FIG. 8 is a block diagram showing an example configuration of a computer according to an embodiment of the present invention.

FIG. 8 shows an example configuration of a computer according to an embodiment of the present invention, on which programs for executing the series of processes described above are installed.

The programs can be recorded in advance in a hard disc 105 or a read-only memory (ROM) 103 included in the computer as a recording medium.

Alternatively, the programs may be stored (recorded) temporarily or permanently on a removable recording medium 111, such as a compact disc read-only memory (CD-ROM), a magneto-optical (MO) disc, a digital versatile disc (DVD), a magnetic disc, or a semiconductor memory. The removable recording medium 111 can be provided in the form of what is called package software.

Instead of installing the programs from the removable recording medium 111 onto a computer as described above, the programs may be transferred to a computer by wireless via an artificial satellite for digital satellite broadcasting or transferred to a computer by wire via a network such as a local area network (LAN) or the Internet so that the programs transferred are received by a communication unit 108 and installed on the hard disc 105 in the computer.

The computer includes a central processing unit (CPU) 102. The CPU 102 is connected to an input/output interface 110 via a bus 101. When instructions are input via the input/output interface 110, for example, by user's operations of an input unit 107, such as a keyboard, a mouse, or a microphone, the CPU 102 executes programs stored in the ROM 103 according to the instructions. Alternatively, the CPU 102 loads into a random access memory (RAM) 104 programs stored in the hard disc 105, programs transferred from a satellite or a network, received by the communication unit 108, and installed on the hard disc 105, or programs read from the removable recording medium mounted on a drive 109 and installed on the hard disc 105, and then executes the programs loaded. Thus, the CPU 102 executes processes according to the flowcharts or processes executed by the configuration shown in block diagrams as described above. Then, as needed, for example, the CPU 102 outputs results of the processes from an output unit 106, such as a liquid crystal display (LCD) or a speaker, sends results of the processes from the communication unit 108, or records results of the processes in the hard disc 105, via the input/output interface 110.

The processing steps of the programs for causing the computer to execute various processes need not necessarily be executed in the orders described herein with reference to the flowcharts, and may include processes that are executed in parallel or individually (e.g., parallel processing or processing by objects).

The programs may be executed by a single computer, or by a plurality of computers in a distributed manner. Furthermore, the programs may be transferred to and executed by a remote computer.

It should be understood by those skilled in the art that various modifications, combinations, sub-combinations and alterations may occur depending on design requirements and other factors insofar as they are within the scope of the appended claims or the equivalents thereof.

What is claimed is:

1. A learning apparatus including a central processing unit, comprising:
    storage means for storing a network formed by a plurality of nodes each holding dynamics;
    learning means for learning the dynamics of the network in a self-organizing manner on the basis of observed time-series data;
    winner-node determining means for determining a winner node, the winner node being a node having dynamics that best match the time-series data, the winner node being determined according to a prediction error corresponding to an average square error between the time-series data and learning data; and
    weight determining means for determining learning weights for the dynamics held by the individual nodes according to distances of the individual nodes from the winner node;
    wherein the learning weight is calculated by raising an attenuation coefficient to a power determined by a ratio between the distance of the individual nodes from the winner node and a variable that is adjusted to decrease as time elapses, and
    wherein the learning means learns the dynamics of the network in a self-organizing manner by degrees corresponding to the learning weights.

2. The learning apparatus according to claim 1, wherein the dynamics are modeled by a dynamical-system approximation model having internal-state quantities.

3. The learning apparatus according to claim 1, wherein the dynamics are modeled by a recurrent neural network.

4. The learning apparatus according to claim 1, wherein the learning means learns the dynamics of the network by a gradient method based on repeated calculation in which the magnitude of a gradient or the number of iterations of the repeated calculation is determined in accordance with the learning weights.

5. A learning method of a learning apparatus including a central processing unit, comprising the steps of:
    determining a winner node among a plurality of nodes holding dynamics and forming a network, the winner node being a node having dynamics that best match observed time-series data;
    determining learning weights for the dynamics held by the individual nodes according to distances of the individual nodes from the winner node, the winner node being determined according to a prediction error corresponding to an average square error between the time-series data and learning data; and
    learning the dynamics of the network in a self-organizing manner on the basis of the time-series data by degrees corresponding to the learning weights,
    wherein the learning weight is calculated by raising an attenuation coefficient to a power determined by a ratio between the distance of the individual nodes from the winner node and a variable that is adjusted to decrease as time elapses.

6. A recording medium storing an executable program that, when executed, controls a computer to execute processing comprising the steps of:
    determining a winner node among a plurality of nodes holding dynamics and forming a network, the winner node being a node having dynamics that best match observed time-series data;
    determining learning weights for the dynamics held by the individual nodes according to distances of the individual nodes from the winner node, the winner node being determined according to a prediction error corresponding to an average square error between the time-series data and learning data; and
    learning the dynamics of the network in a self-organizing manner on the basis of the time-series data by degrees corresponding to the learning weighs,
    wherein the learning weight is calculated by raising an attenuation coefficient to a power determined by a ratio between the distance of the individual nodes from the winner node and a variable that is adjusted to decrease as time elapses.

7. A learning apparatus including a central processing unit, comprising:
    a storage unit configured to store a network formed by a plurality of nodes each holding dynamics;
    a learning unit configured to learn the dynamics of the network in a self-organizing manner on the basis of observed time-series data;
    a winner-node determiner configured to determine a winner node, the winner node being a node having dynamics that best match the time-series data, the winner node being determined according to a prediction error corresponding to an average square error between the time-series data and learning data; and
    a weight determiner configured to determine learning weights for the dynamics held by the individual nodes according to distances of the individual nodes from the winner node;
    wherein the learning weight is calculated by raising an attenuation coefficient to a power determined by the distance of the individual nodes from the winner node and a variable, and
    wherein the learning weight is calculated by raising an attenuation coefficient to a power determined by a ratio between the distance of the individual nodes from the winner node and a variable that is adjusted to decrease as time elapses.

* * * * *